United States Patent [19]

Koening et al.

[11] Patent Number: 5,314,517
[45] Date of Patent: May 24, 1994

[54] METHOD CONTROLLING THE DRAW RATE IN THE DRAWING OF A GLASS FEEDSTOCK

[75] Inventors: David M. Koening, Lowman; Peter J. Majestic; Richard O. Maschmeyer, both of Corning, all of N.Y.

[73] Assignee: Corning Incorporated, Corning, N.Y.

[21] Appl. No.: 999,081

[22] Filed: Dec. 31, 1992

[51] Int. Cl.$^5$ ............................................. C03B 23/047
[52] U.S. Cl. ........................................ 65/2; 65/3.11; 65/13; 65/29; 65/DIG. 13; 65/163
[58] Field of Search ............. 65/13, 29, 163, DIG. 13, 65/1, 158, 2, 3.11

[56] References Cited

U.S. PATENT DOCUMENTS

| | | |
|---|---|---|
| 3,652,248 | 3/1972 | Loxley et al. . |
| 4,076,512 | 2/1978 | Mellor et al. . |
| 4,280,827 | 7/1981 | Murphy ................................. 65/13 |
| 4,631,079 | 12/1986 | Clark et al. . |
| 4,793,840 | 12/1988 | Harding ................................. 65/13 |
| 5,073,179 | 12/1991 | Yoshimura ............................. 65/2 |
| 5,079,433 | 1/1992 | Smith ..................................... 65/29 |

OTHER PUBLICATIONS

O. J. M. Smith, "Closer Control of Loops with Dead Time", Chem. Eng. Progress, vol. 53, No. 5, pp. 217-219, May 1957.

D. M. Koenig, Control and Anaylsis of Noisy Processes, pp. 40-41, 73-85, Prentice-Hall, 1991.

L. R. Glicksman, "The Dynamics of a Heated Free Jet of Variable Viscosity Liquid at Low Reynolds Number", J. of Basic Engineering, pp. 343-354, Sep. 1968.

Primary Examiner—W. Gary Jones
Assistant Examiner—John Hofmann
Attorney, Agent, or Firm—Bruce E. Kamerer

[57] ABSTRACT

A method for drawing glass objects from glass feedstock, wherein a dimension of the glass object is measured on-line and controlled by a control structure which compensates for the deadtime between a change to the drawing speed and the measurement of the effect of that change to the measured dimension. The model which compensates for the deadtime is preferably nonlinear, and the control gains and model parameters are preferably continuously calculated during the drawing process. The invention is particularly applicable to drawing optical waveguide cane from optical waveguide preforms.

19 Claims, 6 Drawing Sheets

METHOD CONTROLLING THE DRAW RATE IN THE DRAWING OF A GLASS FEEDSTOCK

BACKGROUND OF THE INVENTION

This invention relates, in general, to a method and apparatus for making glass objects from glass feedstock in which the control of a dimension of the glass object is greatly improved. This invention relates particularly to the processing of core preforms to form optical waveguide cane from which overclad preforms can be produced for drawing into optical waveguide fibers. This invention also relates to the manufacture of optical waveguide components, such as couplers and planar optical waveguides, which require dimensional control during manufacture.

In the manufacture of optical waveguide, fiber, one process which is known involves the manufacture of a core preform from which optical waveguide cane is drawn. The optical waveguide cane is then overclad to form an overclad preform which is then drawn into optical waveguide fiber. This "two-step" process has the advantage of better control of the refractive index profile of the resulting fiber and of more efficient manufacturing which leads to lower costs.

A critical parameter to control, when drawing cane from a core preform, is the diameter of the cane. Variations in the diameter of the drawn cane can result in changes in the core-clad ratio of an optical fiber drawn from an overclad preform produced from such cane. These variations in the core-clad ratio will degrade the transmission characteristics of the resulting optical fiber.

A typical apparatus for drawing cane from a core preform is shown in FIG. 1. A blank feed mechanism 1 lowers a blank 5 into a furnace 2. The furnace 2 heats an end of blank 5 to its softening temperature. A cane drawing mechanism 4 draws cane 6 from the softened end of blank 5. The diameter of cane 6 is measured by a measuring device 3. The drawing rate is controlled by a computing device 8 to achieve cane with a predetermined diameter. Measuring device 3 is generally a non-contact, optical measurement to avoid damage to the pristine surface of the cane as it is drawn.

As blank 5 is softened, a cone-like root section 7 is formed from which cane 6 is drawn. The length of this cone-like root is a function of the length of the hot zone of furnace 2, with cone-like root section 7 being longer for furnaces with longer hot zones.

Although the cane diameter is generally determined by the drawing speed of mechanism 4, disturbances in the diameter of the drawn cane may be caused, for example, by variations in the physical characteristics of blank 5 and changes in the ambient conditions surrounding the cane drawing apparatus. Because of the relatively long distance between measuring device 3 and cone-like root section 7 where the cane is formed and the relatively slow speed at which the cane is drawn, the control of the diameter of cane 5 is characterized by a significant deadtime between the actual variation in the diameter of cane 6 and its detection at the measuring device 3.

In the past, changes to the drawing speed of the cane, $V_c$, were determined by a proportional-integral (PI) control algorithm, based on the error between the measured diameter and the desired diameter or set point. The PI algorithm can be expressed as:

$$V_c(t) = V_c(0) + P\left[E(t) + \frac{1}{\tau_I}\int_0^t E(u)du\right] \quad (1)$$

where $$E = OD_{sp} - OD \quad (2)$$

$OD_{sp}$ = diameter set point
$OD = 2*R_c$ = measured outside diameter
$R_c$ = cane radius
$V_c(0)$ = initial drawing speed
P = proportional control gain
$\tau_I$ = integral reset time
t = time When implemented by a computer, the PI control algorithm in equation (1) above is realized in the discrete time domain as $$V_c(t) = V_c(t-h) + P[E(t) - E(t-h)] + IhE(t) \quad (3)$$

where
h = control interval
I = integral control gain

It is sometimes beneficial to smooth the measured diameter, OD, by a filter that reduces the impact of high frequency disturbances. That filter may include, for example, an N-point moving average to generate a filtered outside diameter, $OD_f$, which is used in the PI control algorithm error of equation (2):

$$OD_f(t) = \frac{1}{N}[OD(t) + OD(t-h) + \ldots + OD(t-(N-1)h)] \quad (4)$$

Equation (2) is then rewritten as:

$$E(t) = OD_{sp} - OD_f(t) \quad (5)$$

As the economic benefits of larger blanks force the use of larger furnaces in the redraw process, the deadtime discussed above increases, posing severe problems for this conventional PI control algorithm which degrade the control of the outside diameter of a drawn cane. For example, when a variation occurs in the outside diameter of the preform, a corresponding change will occur in the outside diameter of the cane being drawn from the preform. This change in diameter will be measured by measuring device 3 and the diameter control loop will cause a change in the drawing speed of mechanism 4. The effect of this change on the outside diameter of the cane will not be measured by measuring device 3 until a length of time equal to the deadtime has expired. Because the control interval, h, is smaller than the deadtime, the diameter control loop will continue to adjust the drawing speed of mechanism 4 based on the measured values of the outside diameter of the cane. If the control interval is equal to or greater than the deadtime, the diameter control loop will not be responsive enough to short term disturbances.

Loxley et al. U.S. Pat. No. 3,652,248 discloses a process for drawing microbore quartz glass tubing, the diameter of said tubing being about 0.1 inch or less, wherein the stability of the outer diameter is enhanced by applying cooling jets of air or inert gas about 1 to 2 inches below a flame heat source used to soften the glass rod feedstock. These cooling jets stabilize the point at which the drawn tubing solidifies to a constant diameter. Adjustments to the fuel mixture to the flame heat source and the cooling gas are made by "skilled operators" based on observations of a thickness gauge reading to obtain the desired final diameter. col. 6, lines 63–73. There is no disclosure or suggestion in Loxley et al. of any control algorithm on which changes to these flow rates are based.

Mellor et al. U.S. Pat. No. 4,076,512 discloses a method for producing a clad glass rod from which optical fiber is drawn. These rods have diameters between 1.5 mm and 8 mm with the diameter controlled to within ±5%. Mellor et al. discloses the use of a "high gain closed loop system" utilizing "a proportional plus integral controller" to regulate the speed of drawing the glass rod based on the measured diameter of the formed rod. col. 2, lines 46–68. There is no disclosure or suggestion in Mellor et al. of any compensation for the deadtime between a change in the drawing rate and the measurement of the change in outside diameter of the glass rod corresponding to the change in drawing rate.

Clark et al. U.S. Pat. No. 4,631,079 discloses a method for drawing glass rods wherein a portion of a glass rod is heated to a first temperature high enough for reflow of the glass, the heated portion is necked down to approximately the desired diameter, the rod is cooled, the necked down portion is progressively reheated to a temperature less than the first temperature but sufficient for reflow, and the rod is stretched during the progressive reheating to the desired final diameter. col. 2, lines 16–27. By reheating the rod at a lower temperature, the viscosity of the glass is increased, and diameter fluctuations in the final drawn rod are reduced because the response of the rod to stretching conditions is dampened by the higher viscosity. Clark et al. does not disclose or suggest any measurement of the diameter of the glass rod during the heating or reheating steps described above. There is also no disclosure in Clark et al. of any control system for regulating stretching conditions to control the diameter of the drawn rod.

SUMMARY OF THE INVENTION

In order to overcome the deficiencies in the control of a dimension of a drawn glass object as noted above, we have developed a method and apparatus for drawing a glass object from a glass feedstock, wherein said apparatus includes a closed loop control system which compensates for the deadtime between effecting a change in a system parameter which affects a measured physical dimension of the glass object and the measurement of the effect of the change on the physical dimension In accordance with one aspect of this invention, an apparatus for drawing optical waveguide core cane from optical core preforms is provided with a cane diameter control loop, in which the deadtime between the effect of a change in drawing rate and the measurement of a corresponding change in the diameter of the cane is compensated for by using a non-linear control algorithm which includes an extension of the so-called Smith Predictor and includes calculation of the required parameters from first principles.

In accordance with another aspect of this invention, a method and apparatus is provided which allows for calculation of the proportional and integral control gains, based on a process model which includes a model gain, a model time constant parameter, and a model deadtime parameter.

In accordance with another aspect of this invention, a method and apparatus is provided which allows for substantially continuous calculation of the control gains, the model gain, and the model parameters during the drawing process.

DETAILED DESCRIPTION

Figure 1:
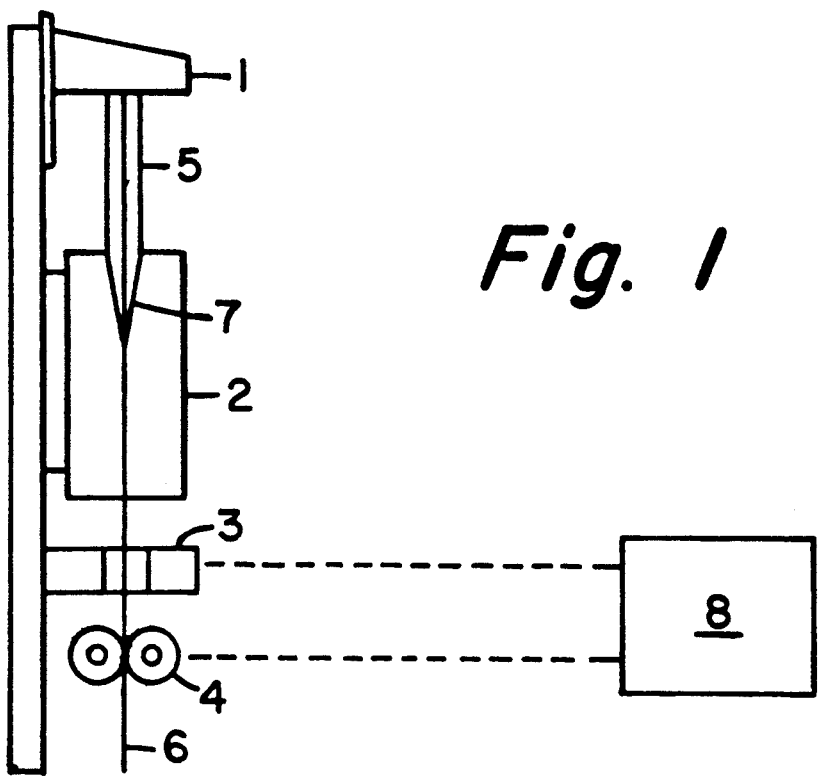
FIG. 1 is a schematic representation of a typical apparatus used to manufacture cane from an core preform.

FIG. 1 shows a typical apparatus for drawing an optical waveguide core cane from an optical waveguide core blank. A blank feed mechanism I lowers a blank 5 into a furnace 2. The furnace 2 heats an end of blank 5 to its softening temperature. A cane drawing mechanism 4 draws cane 6 from the softened end of blank 5. The diameter of cane 6 is measured by a measuring device 3. The drawing rate is controlled by a computing device 8 to achieve cane with a predetermined diameter. Measuring device 3 is generally a non-contact, optical measurement to avoid damage to the pristine surface of the cane as it is drawn.

When the diameter of cane 6, as measured by device 3, changes due to various disturbances, such as a variation in the physical characteristics of blank 5 or other drawing conditions, computing device 8 adjusts the drawing rate of mechanism 4 to compensate and maintain the diameter of cane 6 at a predetermined target. This change in the drawing rate affects the diameter of the cane in the region of cone-like root section 7 where the glass is still above a temperature at which the glass can deform. Because of the distance between cone-like root section 7 and measuring device 3 and the relatively slow drawing rates, a significant deadtime exists between the change in drawing rate of mechanism 4 and the detection of the effect of that change by measuring device 3.

The deadtime can be explained by way of example. If measuring device 3 is located a distance $L_{sensor}$ (in mm) away from the cone-like root section 7 and the drawing rate of mechanism 4 is $V_c$ (in mm/min), then the deadtime, DT, (in seconds) is given by $$DT = \frac{L_{sensor} 60}{V_c} \quad (6)$$

In other words, when cane 6 is being drawn at a rate of $V_c$ mm/min, it will take DT seconds for the cane to travel the distance $L_{sensor}$ mm from cone-like root section 7 to measuring device 3.

A control strategy using only a PI control algorithm will not perform satisfactorily because of the presence of the deadtime. The deficiency in such a strategy is a consequence of the integral term. If the measured OD deviates from the target value, the integral term will begin to integrate the error. This integration will continue until the measured OD returns to the target value. The deadtime delays detection of the response of the measured OD to the control action. Therefore, this integration will occur for an extended time period, which results in an overcorrection of the drawing speed. Not only does the PI control algorithm not account for any deadtime, but the integral term will magnify the effect of the deadtime as discussed above.

To compensate for the deadtime and the filtering of the measured diameter, we have developed a control structure which incorporates (a) filtering of the speed at which cane is drawn, (b) a non-linear process model having a variable deadtime, and (c) techniques for calculating the parameters that occur in the control algorithm. This control structure is a nonlinear extension of the linear Smith Predictor and does not require trial and error tuning. (J. M. Smith, "Closer Control of Loops with Deadtime", Chem. Eng. Progress, vol. 53, no. 5, May 1957, pages 217–219).

The conventional Smith Predictor is based on a first-order-with-deadtime process model that has the following form:

$$\tau_m \frac{dOD}{dt} + OD = G_m V_c(t - DT_m) \quad (7)$$

where $\tau_m$ is the model time constant, $G_m$ is the model gain and $DT_m$ is the model deadtime. The model deadtime is assumed to be factorable into the product of the control interval h and a deadtime index $d_m$, where $DT_m = d_m * h$. This model, containing these three parameters which must be determined, will be compared with the model in our approach later on. The conventional Smith Predictor also uses a PI control algorithm for which two control gains must be determined. Our method is a nonlinear extension of the Smith Predictor and contains direct methods for determining both the model parameters and the control gains.

In the process of drawing a glass rod from a preform, a cylindrical preform or blank having a diameter BD (or radius $R_b$) is fed into a furnace at a speed $V_b$ (the downfeed speed). As a consequence of heating inside the furnace, a portion of the preform becomes viscous, the preform diameter decreases, and a cone-like root section is formed, from which a cane of diameter OD is drawn at a rate $V_c$. At steady state, conservation of mass requires that $$BD^2 V_b = OD^2 V_c \quad (8)$$

The dynamic response of the cane diameter OD to the drawing speed, $V_c$, can be approximated by a non-linear first-order-with-deadtime unity-gain filter where the filter input is the delayed diameter $OD_{ss}$, which is the diameter that the cane would reach in steady state if the blank diameter, downfeed speed, and drawing speed were left unchanged. The deadtime is part of the time argument of $OD_{ss}$ because of the distance between the cone-like root section and the diameter measuring device.

$$\tau_m \frac{dOD}{dt} + OD = OD_{ss}(t - DT_m) \quad (9)$$

where $\tau_m$ is the time constant of the model, $DT_m$ is the model deadtime (where $DT_m = d_m * h$). The input to the model, $OD_{ss}$, can be derived from equation (8) to be $$OD_{ss}(t) = BD \sqrt{\frac{V_b}{V_c(t)}} \quad (10)$$

The model embodied by equations (9) and (10) is an extension of the conventional Smith Predictor model given in equation (7) in the sense that (a) it is nonlinear and (b) it implicitly contains the model gain $G_m$, so that $G_m$ does not have to be determined separately. Subsequently, we will show that in our approach, unlike the Smith Predictor, the model time constant, the model deadtime, and the two control gains can be determined from first principles, rather than through trial and error.

If the drawing speed, $V_c$, is adjusted according to a conventional PI control algorithm without a Smith Predictor as shown in equation (1), the deadtime and moving average will create problems in controlling the outside diameter of the cane (see D. M. Koenig, "Control and Analysis of Noisy Processes", §§ 1.8.2 and 2.6.3, pp. 40–41, 79–85, Prentice-Hall, 1991). Even with the use of a computer, which leads to the PI algorithm of equation (3) in the discrete time domain, and smoothing the measured diameter with the N-point moving average of equation (4), the conventional PI algorithm will not successfully control the outside diameter of the cane because of the deadtime.

In our approach, to compensate for the deadtime and the moving average, the PI control algorithm is imbedded in a larger control structure consisting of two process models and a second N-point moving average. This enhanced control structure is illustrated in block diagram form in FIG. 2.

The drawing speed from the output of the PI control algorithm is sent to the process and is also split into two additional paths. In path A of FIG. 2, the drawing speed is transformed into a steady state outside diameter according to equation (10). The steady state outside diameter, $OD_{ss}$, is then used to drive a first order filter as shown in equation (9) except that there is no deadtime.

$$\tau_m \frac{dOD_o}{dt} + OD_o = BD \sqrt{\frac{V_b}{V_c(t)}} \quad (11)$$

where $OD_o$ is the undelayed model diameter (no deadtime) and $\tau_m$ is the model time constant. Note that, unlike the conventional Smith Predictor as expressed in equation (7), there is no model gain $G_m$ explicit in equation (11). Instead, $G_m$ is implicit and, therefore, does not need to be determined separately. As will be shown below, $G_m$ is used to determine the control gains and it can be therefore determined by differentiating equation (8) to give $$G_m = \frac{\partial OD}{\partial V_c} = \frac{\partial \left[ BD \sqrt{\frac{V_b}{V_c}} \right]}{\partial V_c} = -\frac{BD}{2} \frac{\sqrt{\frac{V_b}{V_c}}}{V_c} \quad (12)$$

Because a computer is used to implement the control structure, equation (11) is expressed in the discrete time domain as $$OD_o(t) = A OD_o(t - h) + (1 - A) BD \sqrt{\frac{V_b}{V_c(t - h)}} \quad (13)$$

where $A = e^{-\frac{h}{\tau_m}}$

Figure 2:
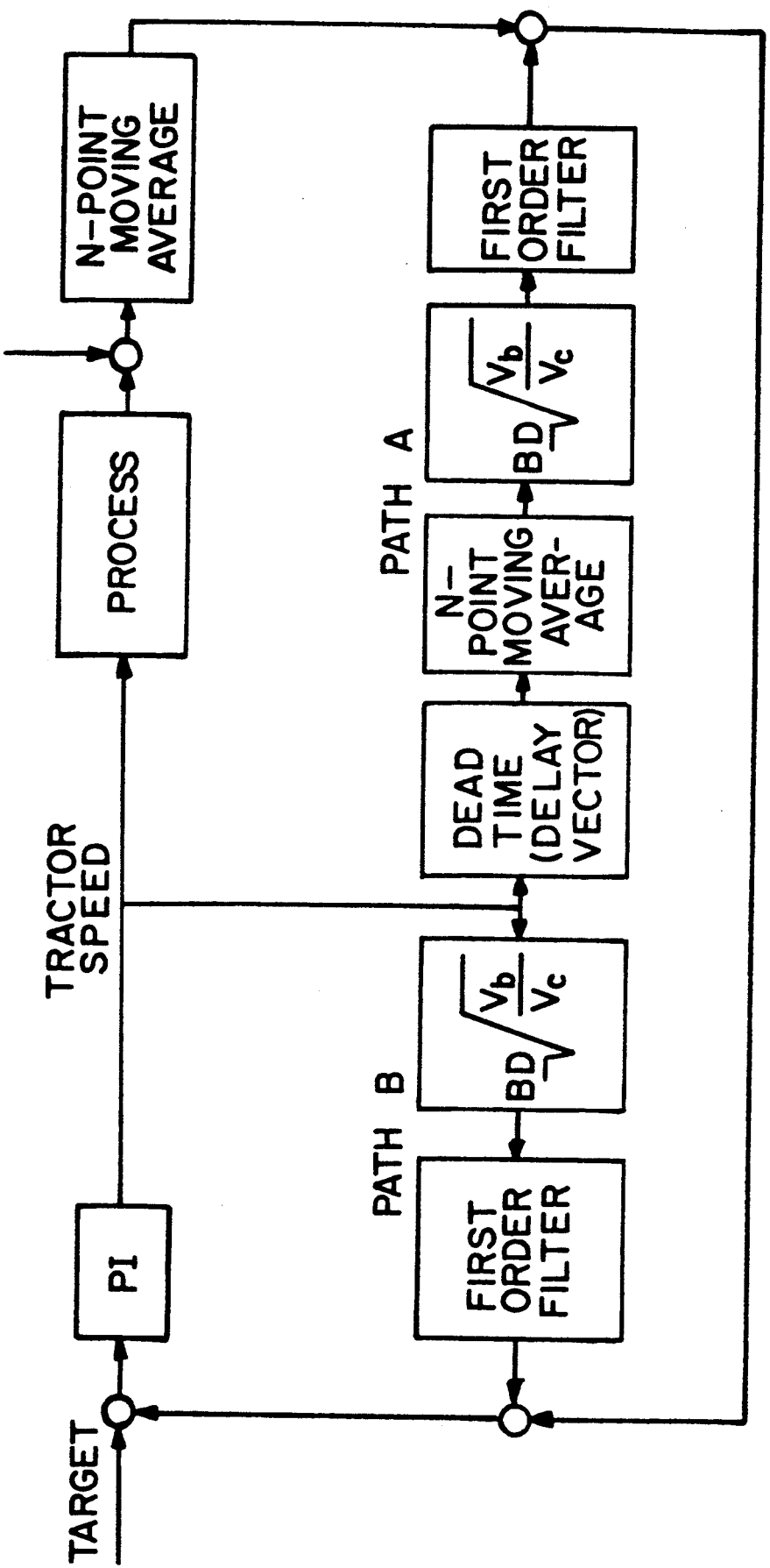
FIG. 2 is a block diagram of the control scheme of the present invention.

In path B of FIG. 2, the drawing speed is filtered as $$\overline{V_c}(t - h - hd_m) = \frac{1}{N} [V_c(t - h - hd_m) + \quad (14)$$

$$V_c(t - 2h - hd_m) + \ldots + V_c(t - Nh - hd_m)]$$

where $d_m$ is a model deadtime index and $d_m * h = DT_m$. This average is designed to compensate for the averaging of the measured diameter which was described in equation (4). The structure of the filter used in path B of FIG. 2 must be the same as the structure of the filter used for the measured process signal. This delayed averaged model drawing speed is then transformed into a steady state outside diameter according to equation (10) and fed to a first order filter with a time constant $\tau_m$ as in equation (9). The result is represented in the discrete time domain as $$OD_m(t) = AOD_m(t - h) + (1 - A)BD\sqrt{\frac{V_b}{\overline{V_c}(t - h - hd_m)}} \quad (15)$$

where $A = e^{-\frac{h}{\tau_m}}$ where $OD_m$ is then delayed model diameter (including deadtime).

Note that path B differs from path A in that path B contains the N-point moving average and the deadtime. When the process signal does not contain significant disturbances, no filtering of the process signal or the feedback signal is required or preferred. However, when it is necessary to filter the process signal, as in equation (4) for example, then a compensating filter is placed in path B of the feedback loop, as in equation (14) for example. In this controller design where compensation for the process signal filtering is provided in the feedback loop, the high frequency response of the control system is improved with only slight degradation of the low frequency response.

Figure 7A:
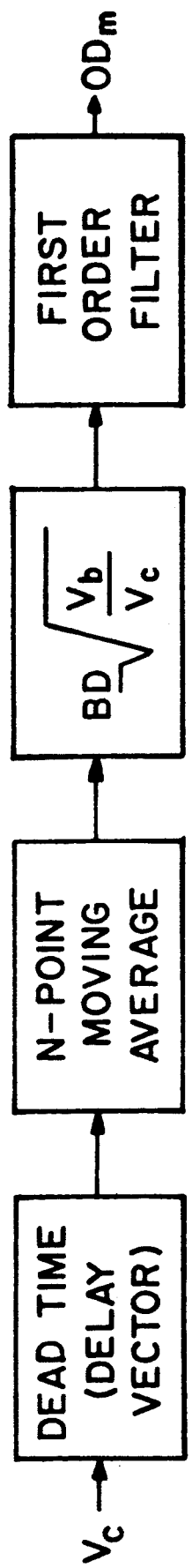
FIGS. 7a–7c are alternative embodiments of the control structure which is the subject of the present invention.
Figure 7B:
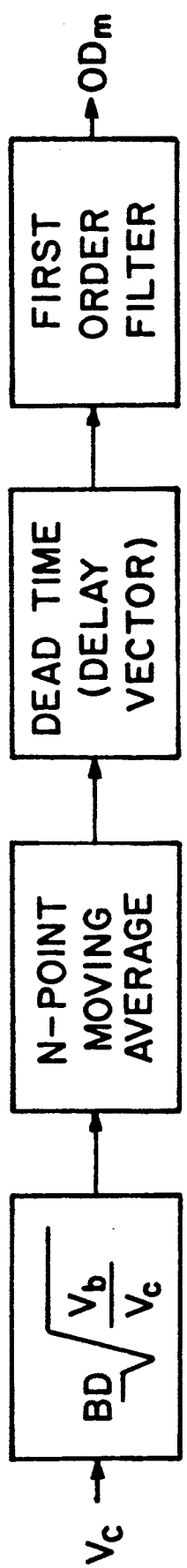
Figure 7C:
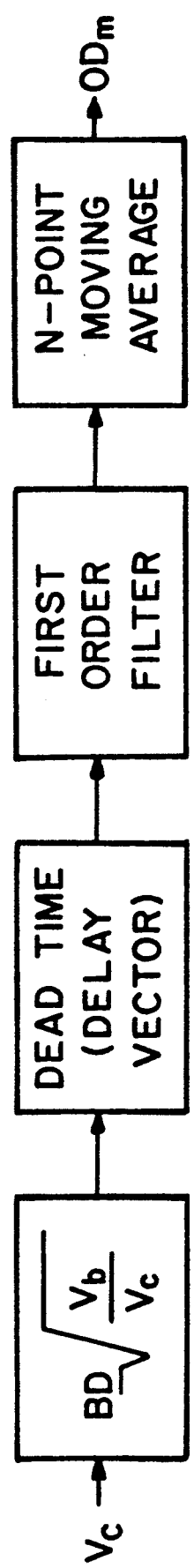

There are alternative ways to configure path B that will produce the same results and these are included in our approach. FIGS. 7a–7c show some of these approaches. The path of FIG. 7a shows a portion of the structure shown in FIG. 2. In this case, the cane speed $V_c$ is placed into a delay vector and the appropriately delayed cane speed is extracted and fed to an N-point moving average. The averaged cane speed is then fed to the square root operation which yields a steady state diameter. This steady state diameter is then fed to a first order filter which has the model time constant. The path in FIG. 7b shows how the square root calculation of the steady state diameter can be carried out first, followed by the N-point moving average (or some other similar low-pass filter), the deadtime delay and finally the first order filter. The path of FIG. 7c shows yet one more permutation where the N-point moving average has been reconfigured as the last step. Since the square root operation is nonlinear, changing the order of the boxes as shown in FIGS. 7a–7c will not produce exactly identical results and there are some advantages of using the permutation shown in FIG. 2 and FIG. 7a with regard to initializing the delay vector. However, the difference in performance is not significant and for the purposes of this patent application they are considered to be the same. Since there are basically four sequential operations that can be arranged in any order, there are 24 possible arrangements that are not significantly different and are part of our approach.

The outputs of these two models, represented by equations (13) and (15), are combined with the filtered measured diameter, expressed by equation (4), and the set point, $OD_{sp}$ to give a controller error, E, as $$E = OD_{sp} - OD_f + OD_m - OD_o \quad (16)$$

If the model described by equation (15) exactly matches the process when there are no disturbances, then $OD_m = OD_f$ and the error seen by the PI control algorithm is $$E = OD_{sp} - OD_o \quad (17)$$

This means that, in effect, since the averaged process is now cancelled by the averaged model with deadtime, the process, as seen by the PI control algorithm, will be a simple first order non-linear model with no deadtime and with no averaging. Therefore, this process is significantly easier to control.

The control gains for the PI control algorithm are determined from the following equations which depend on the model parameters $\tau_m$ and $G_m$ and a third parameter $\tau_D$ which is yet another time constant that characterizes the response of the diameter to a hypothetical change in the diameter set point:

$$P = \frac{1 - e^{-\frac{h}{\tau_D}}}{G_m (1 - e^{-\frac{h}{\tau_m}})} \quad (18)$$

$$I = \frac{1 - e^{-\frac{h}{\tau_D}}}{hG_m}$$

$$\tau_D = \chi \tau_m$$

If $\tau_D$ is small, the response to a change in set point would be rapid. On the other hand, if $\tau_D$ is large, the response to a change in set point would be sluggish. Thus, $\tau_D$ is a measure of how aggressive the controller will be. Our experience suggests that $\tau_D$ is preferably equal to one half the process time constant, $\tau_m$, therefore X is preferably equal to 0.5. Disturbances of different amplitudes or frequencies, however, may benefit from slightly different ratios. It may even be advantageous to change the ratio during cane drawing process. These equations for the determination of the control gains appear in D. M. Koenig, "Control and Analysis of Noisy Processes", §2.5, pp. 73–75.

$\tau_D$, $\tau_m$, and $G_m$ can be calculated automatically and continuously. Therefore, P and I can be calculated automatically and continuously according to equation (18). Since the control gains appearing in the PI control algorithm are complicated dynamic functions of the process model parameters which in turn can depend dynamically on the cane speed and diameter set point, this PI control algorithm will be referred to as a "non-linear" PI control algorithm.

At this point the control algorithm is defined in terms of a model gain, a model time constant, a model deadtime and two control gains. The two control gains have been shown to depend on the model gain, the model time constant and an adjustable time constant that specifies the aggressiveness of the control action. In the following discussion we will develop methods that allow the model gain, the model deadtime (through the deadtime index) and the model time constant to be calculated from known process variables and easily determinable physical characteristics of the draw tower.

First, the model gain has been shown in equation (12) to be determined from the blank diameter, the blank velocity or downfeed speed and the drawing speed. These process variables are already known to the computing device 8, so no additional information is needed.

Second, using the logic behind equation (6), the deadtime index $d_m$ can be shown to depend on the length between the cone-like root section 7 and measuring device 3:

$$d_m = \frac{L_{sensor} 60}{h V_c} \tag{19}$$

The length, $L_{sensor}$, can be estimated from the physical dimensions between furnace 2 and measuring device 3. $L_{sensor}$ can also be determined by making step changes in drawing speed and measuring the time required for a corresponding change in the cane diameter to be measured by device 3. The arguments presented on the next page indicate that $L_{sensor}$ is substantially independent of process variables, including blank diameter, downfeed speed, cane diameter, and drawing speed. Therefore, $L_{sensor}$ need only be determined once for a given draw tower.

The deadtime index $d_m$ is used to extract delayed values from a delay vector. For example, at any control time, the current value of the variable to be delayed would be entered into the i th element of the delay vector. The delayed value would be extracted from the $i - d_m$ th element. Since $d_m$ is dynamically changing because of equation (19), it is possible for the pointer to the delayed element, $i - d_m$, to point to an element that has been used at a previous control time. For example, should $V_c$ decrease significantly such that $d_m$ increases by more than 1, then $i - d_m$ will point to a value that had been extracted before the last control time. When the delayed quantity is rapidly changing as would be the case during a start up or during a set point change, this kind of error is significant. To prevent this in our approach, the increase in the quantity $d_m$ is limited to 1.

The method discussed above affects a deadtime by using a fixed control interval and a variable deadtime index. An alternate approach would vary the control interval inversely with the cane speed and keep the deadtime index $d_m$ constant. In this case, if $V_c$ should decrease significantly, the control/sampling interval would increase and the above described storing and extracting would take place without the worry of fetching a delayed value that had already been seen. This would change some of the other calculations.

Third, the dependence of the model time constant on easily determinable quantities will be shown in the following paragraphs which summarize a relatively complicated derivation.

The basic idea is to force fit a first order model to the drawing process from a first principles starting point. Then, by using the chain rule of calculus and a Taylor's series linearization, an expression for the time constant will be derived from this first order model. The derivation starts with a dynamic mass balance over the cone-like root section:

$$\frac{d}{dt} \int_0^L \rho \pi R(z) dz = V_b \rho \pi R_b^2 - V_c \rho \pi R_c^2 \tag{20}$$

where L is the length of the root, R(z) is the radius within the cone-like root section of the blank, so that $R(L) = R_c$ and $OD = 2 * R_c$, and $\tau$ is the blank density.

The chain rule of calculus is applied to the right hand side of equation (20) which is then linearized yielding $$\tau_m \frac{dOD}{dt} + OD = \frac{2 V_b R_b^2}{V_c OD_{sp}} + \frac{OD_{sp}}{2} \tag{21}$$

where the model time constant in equation (21) can be written as $$\tau_m = \frac{2}{V_c OD_{sp}} \int_0^L R(z) \frac{\partial R(z)}{\partial R_c} dz \tag{22}$$

To evaluate the integrand in equation (22), one needs an expression for R(z).

An expression for R(z) may be obtained by starting with equation (23) (see, Glicksman, L. R., "The Dynamics of a Heated Free Jet of Variable Viscosity Liquid at Low Reynolds Number," Journal of Basic Engineering, pages 334–354, 1968).

$$\ln \frac{R(z)}{R_b} = -\frac{F}{6Q} \int_0^z \frac{dz}{\mu(z)} \tag{23}$$

where Q is the volumetric flow rate and F is the draw pulling force. Evaluating at $z = L$, solving for F, and substituting back into equation (23) yields $$\frac{\ln\left(\frac{R(z)}{R_b}\right)}{\ln\left(\frac{R_c}{R_b}\right)} = \frac{\int_0^z \frac{dz}{\mu(z)}}{\int_0^L \frac{dz}{\mu(z)}} \tag{24}$$

Assuming the glass temperature profile is determined primarily by furnace temperature profile and is substantially independent of the rate at which glass enters or exits the furnace, the right-hand-side of equation (24) depends only on material and furnace conditions. We have determined that the material dependence is relatively insignificant, so it is convenient to define a furnace function, $\Im$, as $$\Im(z) = \int_0^z \frac{dz}{\mu(z)} \tag{25}$$

such that equation (24) may be rewritten as $$\frac{\ln \frac{R(z)}{R_b}}{\ln \frac{R_c}{R_b}} = \frac{\Im(z)}{\Im(L)} \tag{26}$$

Equation (26) implies the length, L, of the cone-like root section is independent of the redraw process variables. That is why $L_{sensor}$ is substantially independent of process variables as noted earlier. $\Im(z)/\Im(L)$ may be determined from the glass temperature profile and viscosity using equation (25) or by measuring a root shape and using equation (26).

Equation (26) may be rewritten as follows:

$$\frac{R(z)}{R_b} = \left[\frac{OD_{sp}}{2R_b}\right]^{\frac{\Im(z)}{\Im(L)}} \quad (27)$$

so that equation (22) can be written as $$\tau_m = \frac{4R_b^2}{V_c OD_{sp}^2} \int_0^L \frac{\Im(z)}{\Im(L)} \left[\frac{OD_{sp}}{2R_b}\right]^{2\frac{\Im(z)}{\Im(L)}} dz \quad (28)$$

which can be numerically integrated because the furnace function is known.

Figure 3:
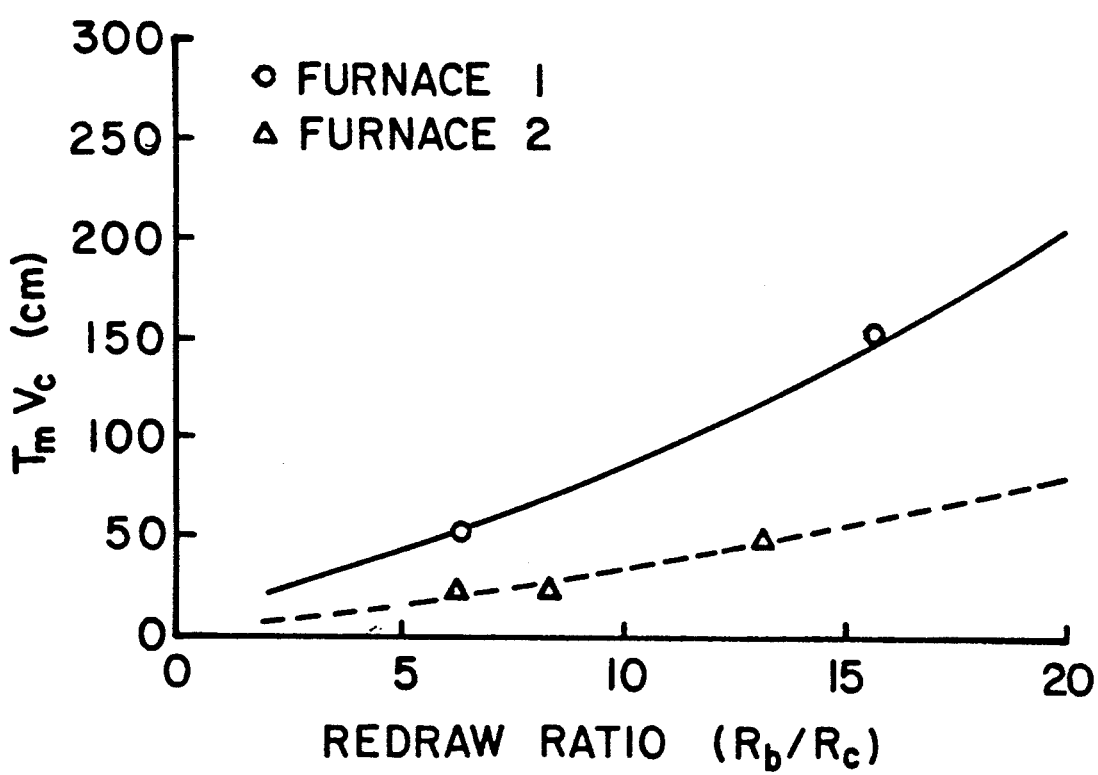
FIG. 3 is a graphic representation of the furnace function for two different furnace designs.

Equation (28) implies that the model time constant is of the form $\tau_m = f(R_b/R_c)/V_c$. In fact, FIG. 3 shows the following quadratic expressions fit the experimental data we have obtained for two particular furnaces:

$$\tau_{m1} = \frac{10.084 + 5.3347\left(\frac{R_b}{R_c}\right) + 0.21756\left(\frac{R_b}{R_c}\right)^2}{V_c} \quad (29)$$

and $$\tau_{m2} = \frac{2.6445 + 2.0066\left(\frac{R_b}{R_c}\right) + 0.073550\left(\frac{R_b}{R_c}\right)^2}{V_c} \quad (30)$$

where $V_c$ is in units of cm/min and $\tau_m$ is in units of minutes.

Thus, the model parameters can all be determined from first principles and the control gains can be derived from the model parameters along with the specification of a time constant that characterizes the aggressiveness of the control action. As shown in the following examples, this non-linear control algorithm is very effective in controlling the diameter of drawn cane in the regime in which the process follows a first order model.

The following examples demonstrate the effectiveness of the present invention in controlling the diameter, or other measured physical dimension, of a glass object which is drawn from a glass feedstock. In each of the following examples, the process was controlled using a control system which compensated for the dead-time in the process by using a non-linear process model according to the present invention.

EXAMPLE 1

Figure 4:
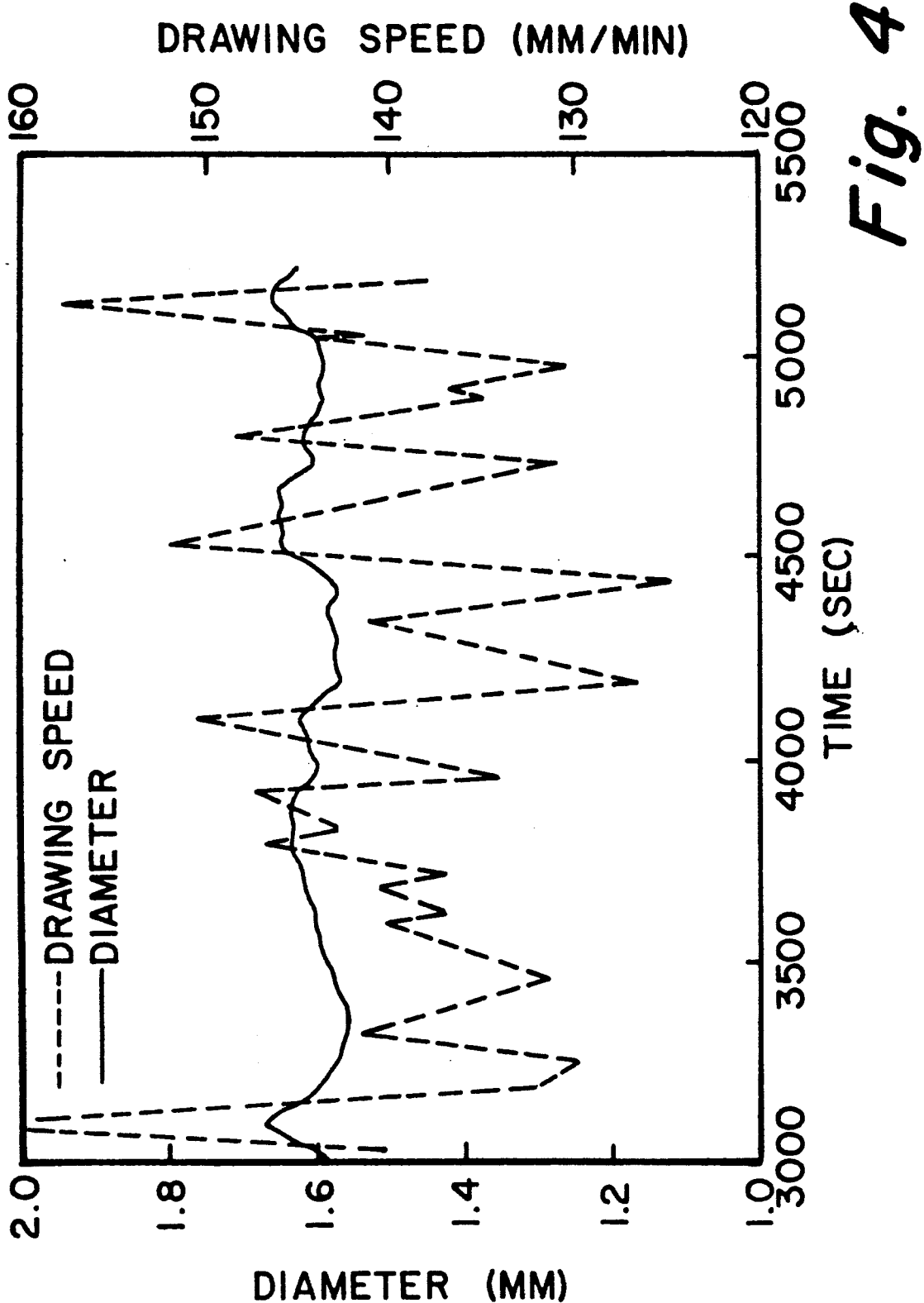
FIGS. 4–6 represent the system response for tests run using the method of the present invention.

A preform made of commercially available Code 7740 tubing was drawn into micropipet tube. The micropipet tube drawing process was performed using a furnace with a furnace function similar to that shown in FIG. 3 as furnace 1. The preform outside diameter was 7.53 mm and inside diameter was 1.492 mm. The target diameters of the micropipet tube drawn therefrom were 1.603 mm outside diameter and 0.317 mm inside diameter. Only the outside diameter of the micropipet tube was measured on-line and controlled. The preform was drawn with a nominal furnace temperature of 1000° C., a downfeed speed of 6.79 mm/min, and a nominal cane speed of 150 mm/min. The control interval, h, was 5 seconds. The length $L_{sensor}$ was 460 mm. No moving average filter was used in this example. The following values are typical of the control parameters that were calculated automatically using the strategies and equations described above:

$G_m = -5.343\ \mu/mm/min$ $P = -0.369\ mm/min$ $I = -0.002\ (mm/min)/sec$ $\tau_m = 159.9\ seconds$ $X = 0.5$ $d_m = 37$ FIG. 4 shows the response of the Outside diameter of the micropipet tube to the control strategy (solid line). The mean value of the outside diameter of the tubing is 1.606 mm, comparing very well with the target of 1.603 mm. One standard deviation of the outside diameter is 0.027 mm or 1.7%. Notice that the diameter control system is making very aggressive pulling speed changes on the order of 10% to maintain the diameter (as shown by the dashed line in FIG. 4).

EXAMPLE 2

A preform, containing $GeO_2$-doped $SiO_2$ glass, was produced by well-known chemical vapor deposition techniques. This preform was drawn into core cane for use in producing an overclad blank which could be drawn into an optical waveguide fiber. The cane drawing process was performed using a furnace with a furnace function similar to that shown in FIG. 3 as furnace 1. The preform outside diameter was 52.2 mm. The target diameter of the cane drawn therefrom was initially set at 4.0 mm and then was changed to 8.1 mm at a time of about 2450 seconds. The preform was drawn with a nominal furnace temperature of 1600° C. and a downfeed speed of 12.26 mm/min. Drawing speeds were nominally 2050 mm/min and 500 mm/min for the 4 mm and 8.1 mm target diameter segments, respectively. The control interval, h, was 5 seconds. The length $L_{sensor}$ was 460 mm. No filter was used in this example. The control parameters were calculated automatically and continuously using the strategies described above. The following values are typical of the two steady-state diameters:

| | | |
|---|---|---|
| $OD_{sp}$ = | 4 mm | 8.1 mm |
| $G_m$ = | $-0.958\ \mu/mm/min$ | $-7.954\ \mu/mm/min$ |
| P = | $-1.946\ mm/min$ | $-0.241\ mm/min$ |
| I = | $-0.053$ | $-0.004\ (mm/min)/sec$ |
| $\tau_m$ = | 34.2 seconds | 59.2 seconds |
| X = | 0.5 | 0.5 |
| $d_m$ = | 3 | 10 |

Figure 5:
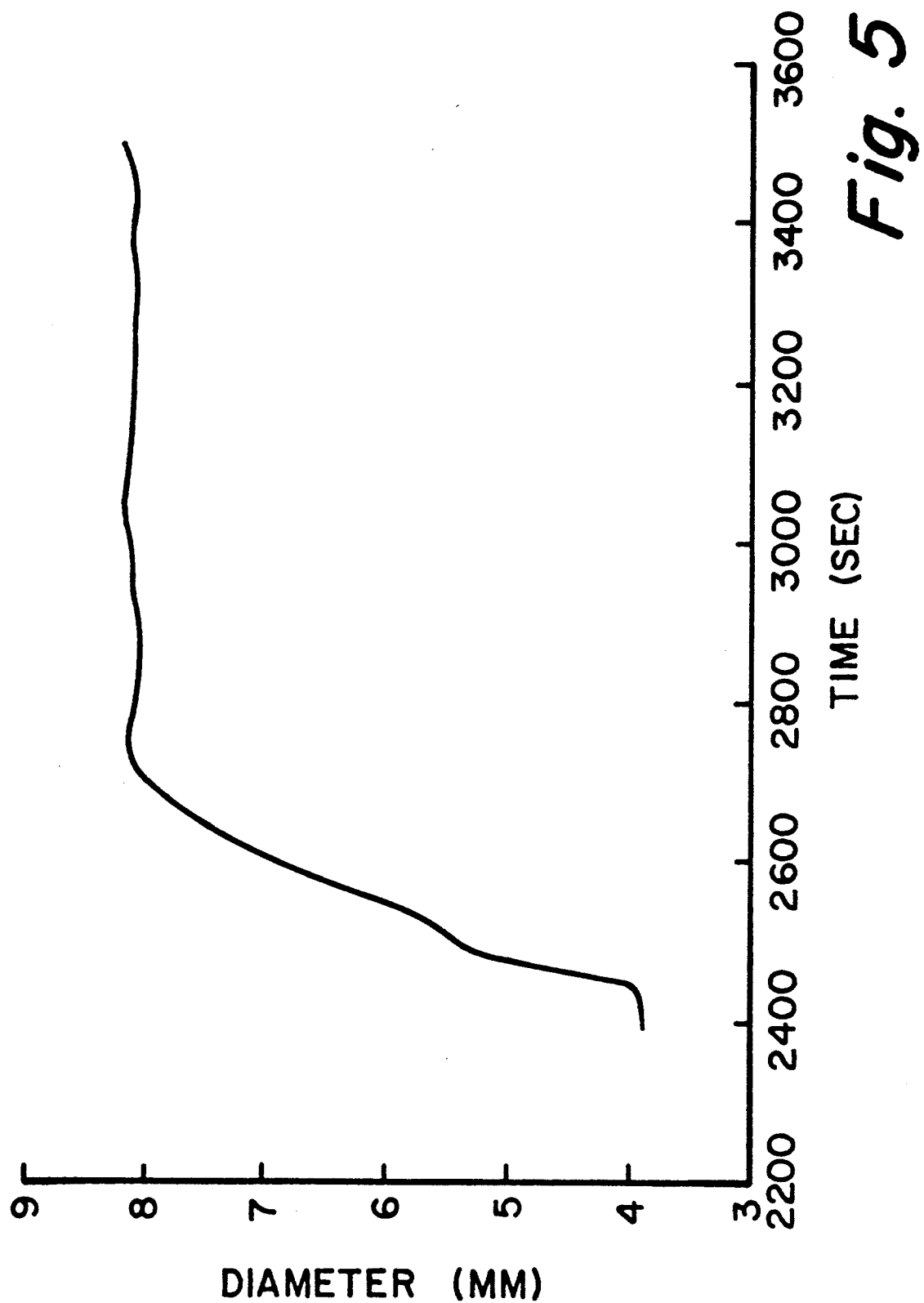

During ramp-up from 4 mm to 8.1 mm, these values were continuously adjusted by the computing device 8. Notice that the values of the control parameters change rather substantially from one process condition to the other. FIG. 5 shows the response of the cane diameter to the control strategy. Notice that the step change in diameter from 4.0 to 8.1 mm is rapid and shows no overshoot, both indicating excellent control. The mean value of the cane diameter is 8.085 mm, comparing very well with the target of 8.1 mm. One standard deviation of the cane diameter is 0.034 mm or 0.4%.

EXAMPLE 3

Figure 6:
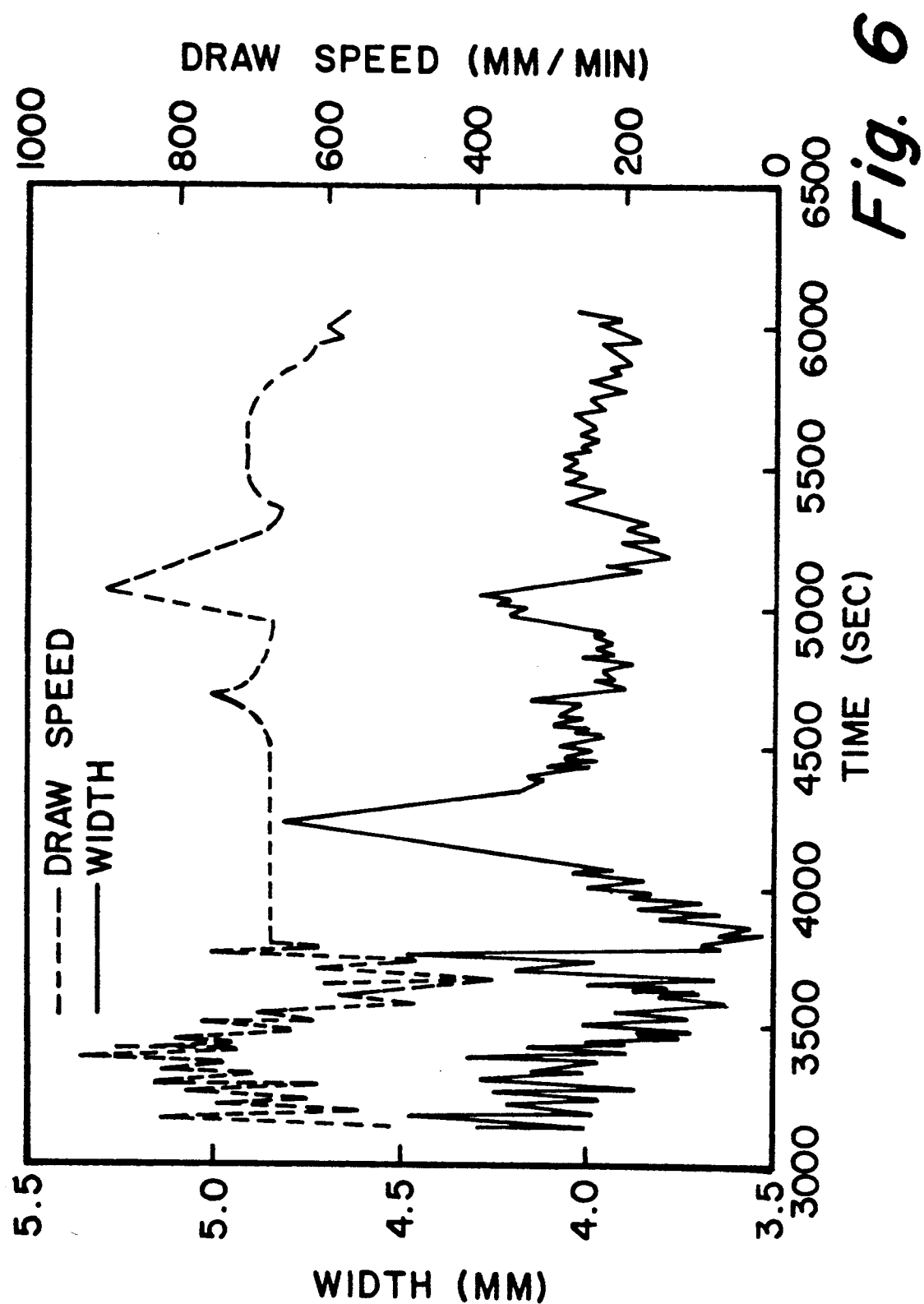

A preform made of commercially available silica plate was drawn into ribbon. The draw was performed using a furnace with a furnace function similar to that shown in FIG. 3 as furnace 2. The preform width and thickness dimensions Were 59.19 mm and 13.02 mm, respectively. The target width of the substantially flat cane drawn therefrom was 4.0 mm. The preform was drawn with a nominal furnace temperature of 2075° C. and with downfeed and nominal cane speed of 3.08 mm/min and 685 mm/min respectively. The control interval, h, was 1 second. The length $L_{sensor}$ was 290 mm. A moving average filter containing 30 points Was used in this example. The following values are typical of the control parameters that were calculated automatically using the strategies and equations described above:

$G_m = -2.966$ microns/mm/min $P = -0.558$ mm/min $\tau = -0.013$ (mm/min)/sec $\chi_m = 42$ seconds $X = 0.5$ $d_m = 21$ FIG. 6 shows the response of the cane width to the control strategy (solid line), along with a plot of draw speed (dashed line). The plot is characterized by three process segments that are most easily distinguished in the draw speed curve. The middle segment (3800 to 4450 seconds) was made at constant draw speed without benefit of automatic control. Th first segment (3100 to 3800 seconds) was made in automatic diameter control with no filter. The third segment (4450 to 6000 seconds) was made in automatic control with a 30-point moving average filter.

As can be seen in the middle segment, the preform has variations that cause the ribbon to have intrinsic width disturbances occurring at two frequencies during the middle segment. The slow disturbances have a period of about 750 seconds and an amplitude of about 0.5 mm. The fast disturbances have a period of about 20 seconds and an amplitude of about 0.05 mm. Since the fast disturbances occur with a period that is comparable to the deadtime of the process (21 seconds), the control algorithm cannot compensate for them. In fact, as can be seen by comparing the first and middle segments, the control algorithm without a filter actually amplifies the fast disturbances. As seen in the third segment, addition of a 30-point moving average filter prevents the controller from reacting to those disturbances. In both automatic control segments, the large tractor speed changes occur as the controller corrects for the slow disturbances.

The quantitative benefit of the control strategy can be seen in the following table:

TABLE I

| Comparison of Control Modes for Example 3 | | | |
|---|---|---|---|
| | Filter | Mean (mm) | Standard Deviation (mm) |
| Set point | — | 4.00 | — |
| Automatic | None | 4.00 | 0.20 |
| Manual | — | 4.10 | 0.35 |
| Automatic | 30 pts | 3.99 | 0.09 |

Under automatic control according to the present invention, mean cane width is ten times closer to the set point and has fluctuations that are approximately two to four times smaller than under manual control. Use of a filter does not significantly degrade the low frequency performance of the control structure, as indicated by the mean values in Table I, but does improve the high frequency performance by a factor of two, as indicated by the standard deviation values in Table I.

Although this invention has been described in detail with respect to a process for drawing cane, with a substantially circular cross-section, from an optical waveguide core blank, it has equal applicability to other processes of drawing glass objects from glass feedstock. For example, non-circular cane could be drawn from feedstock by substituting a representative measurement (such as major axis for cane with an elliptical crosssection) and a corresponding measurement of the feedstock for cane outside diameter and preform diameter, respectively. Also, the control structure of the present invention is applicable to other glass objects drawn from feedstock such as optical waveguide couplers, planar optical waveguides, and micropipet tubing.

We claim:

1. A method for drawing a glass object from a glass feedstock, comprising,
   a. providing a glass feedstock,
   b. heating said glass feedstock to its softening temperature,
   c. drawing said glass feedstock into a glass object at a drawing speed which is adjustable, and
   d. adjusting the drawing speed to control a dimension of said glass object,
   wherein said step of adjusting the drawing speed comprises comparing an on-line measurement of said dimension to a predetermined target value and compensating for an inherent deadtime which exists between a change in the drawing speed and the detection of the effect of said change in the drawing speed on said dimension.

2. The method of claim 1, wherein said step of adjusting further comprises using a model which represents the effect on said dimension resulting from the change in the drawing speed by a group of parameters, said group of parameters comprising a model gain, a proportional control gain, an integral control gain, a model time constant parameter, and a model deadtime parameter.

3. The method of claim 2, wherein said model further comprises a nonlinear proportional plus integral control algorithm.

4. The method of claim 3, wherein at least one of said group of parameters are determined empirically.

5. The method of claim 3, wherein at least one of said group of parameters are determined by direct calculation.

6. The method of claim 5, wherein said direct calculation occurs during the step of drawing said glass feedstock into said glass object.

7. The method of claim 2, wherein said on-line measurement of said dimension is filtered to reduce the impact of process disturbances.

8. The method of claim 7, wherein said model filters the value of the drawing speed to compensate for the filtering of said on-line measurement of said dimension.

9. The method of claim 8, wherein at least one of said group of parameters are determined empirically.

10. The method of claim 8, wherein at least one of said group of parameters are determined by direct calculation.

11. The method of claim 10, wherein said direct calculation occurs during the step of drawing.

12. The method of claim 2, wherein at least one of said group of parameters are determined empirically.

13. The method of claim 2, wherein at least one of said group of parameters are determined by direct calculation.

14. The method of claim 13, wherein said direct calculation occurs during the step of drawing.

15. The method of claim 1, wherein said glass object is one from the group consisting of an optical waveguide cane, a micropipet tube, and an optical waveguide coupler.

16. A method for manufacturing a cane for optical fiber, comprising
   a. providing a preform,
   b. heating an end of said preform to its softening temperature, and
   c. drawing said cane from said softened end of said preform,
   wherein the diameter of said cane is controlled by adjusting the drawing speed at which said cane is drawn from said preform by comparing an on-line measurement of the diameter of said cane to a predetermined target value and compensating for an inherent deadtime which exists between a change in the drawing speed and the detection of the effect of said change in the drawing speed on the diameter and wherein said step of compensating occurs substantially continuously during said step of drawing said cane.

17. The method of claim 16, wherein said step of adjusting further comprises using a model which represents the effect on the diameter as a function of the drawing speed, said model comprising a model deadtime parameter, a model time constant parameter, and a model gain, and wherein said model is nonlinear.

18. The method of claim 17, wherein said model gain and parameters are calculated substantially continuously during said step of drawing said cane.

19. The method of claim 16, wherein said model further comprises a filter to compensate for any filtering of the measured diameter of said cane.

* * * * *

UNITED STATES PATENT AND TRADEMARK OFFICE
CERTIFICATE OF CORRECTION

PATENT NO. : 5,314,517
DATED : May 24, 1994
INVENTOR(S) : Koenig et al.

It is certified that error appears in the above-indentified patent and that said Letters Patent is hereby corrected as shown below:

On the Cover Page, in both instances, the Inventor's name "Koening" should read -- Koenig --.

Col. 1, line 17 thereof, after "waveguide" delete -- , --.

Col. 3, line 50 thereof, after "dimension" insert -- . --.

Col. 7, line 31 thereof, delete "then" and insert therefor -- the --.

Col. 8, line 11 thereof, delete "(16" and insert therefor -- (16) --.

Col. 10, line 12 thereof, delete "$\tau$" and insert therefor -- $\rho$ --.

UNITED STATES PATENT AND TRADEMARK OFFICE
CERTIFICATE OF CORRECTION

PATENT NO. : 5,314,517
DATED : May 24, 1994
INVENTOR(S) : Koenig et al.

It is certified that error appears in the above-indentified patent and that said Letters Patent is hereby corrected as shown below:

Col. 12, line 21 thereof, delete "Outside" and insert therefor -- outside --.

Col. 13, line 13 thereof, delete "Were" and insert therefor -- were --.

Col. 13, line 20 thereof, delete "Was" and insert therefor -- was --.

Col. 13, line 28 thereof, delete "$\tau=-0.013$ (mm/min)/sec" and insert therefor -- $I=-0.013$ (mm/min)/sec --.

Col. 13, line 30 thereof, delete "$\chi m$"=42 seconds" and insert therefor -- $\tau_m$=42 seconds --.

Signed and Sealed this

Third Day of January, 1995

Attest:

BRUCE LEHMAN

*Attesting Officer*        *Commissioner of Patents and Trademarks*